(12) United States Patent
Grady

(10) Patent No.: US 7,502,499 B2
(45) Date of Patent: Mar. 10, 2009

(54) SYSTEM AND METHOD FOR FILTERING NOISE FROM A MEDICAL IMAGE

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 653 days.

(21) Appl. No.: 11/221,025

(22) Filed: Sep. 7, 2005

(65) Prior Publication Data
US 2006/0093194 A1 May 4, 2006

Related U.S. Application Data

(60) Provisional application No. 60/624,368, filed on Nov. 2, 2004.

(51) Int. Cl.
G06K 9/00 (2006.01)
G06K 9/32 (2006.01)

(52) U.S. Cl. .................................. 382/128; 382/300
(58) Field of Classification Search ................ 382/128, 382/300
See application file for complete search history.

(56) References Cited

U.S. PATENT DOCUMENTS 5,581,371 A * 12/1996 Spaulding et al. ......... 358/3.03
6,463,167 B1 * 10/2002 Feldman et al. ............ 382/128
6,754,374 B1 * 6/2004 Miller et al. ............... 382/128
6,856,705 B2 * 2/2005 Perez et al. ................ 382/264
7,257,276 B2 * 8/2007 Jiang et al. ................ 382/300

OTHER PUBLICATIONS

Multi-label Image segmentation for medical applications, Gareth et al. May 15, 2004.*
Aisotropic Interpolation on Graphs, Eric et al, Jul. 21, 2003.*
Sampling density compensation in MRI, James et al., Jul. 7, 1998.*
Eric et al. Anisotropic interpolation on graphs, Jul. 21, 2003,pp. 1-18.*

* cited by examiner

Primary Examiner—Jingge Wu
Assistant Examiner—Jayesh A Patel
(74) Attorney, Agent, or Firm—Donald B. Paschburg; F Chau & Associates, LLC

(57) ABSTRACT

A system and method for filtering noise from a medical image are provided. A method for filtering noise from an image comprises: generating a weighted graph representing the image; selecting a plurality of nodes from the image to retain grayscale values of the plurality of nodes; and determining filtered grayscale values of the plurality of nodes.

11 Claims, 3 Drawing Sheets

SYSTEM AND METHOD FOR FILTERING NOISE FROM A MEDICAL IMAGE

CROSS-REFERENCE TO RELATED APPLICATION

This application claims the benefit of U.S. Provisional Application No. 60/624,368, filed Nov. 2, 2004, a copy of which is herein incorporated by reference.

BACKGROUND OF THE INVENTION

1. Technical Field

The present invention relates to image processing, and more particularly, to a system and method for filtering noise from a medical image.

2. Discussion of the Related Art

Medical images are frequently noisy, due both to varying image data and artifacts resulting from an acquisition system such as an ultrasound, positron emission tomography (PET) or computed tomography (CT) scanner. Recently, nonlinear diffusion methods have proven useful for reducing image noise in many fields ranging from medical applications and image-sequence analysis to computer aided quality control and post-processing of noisy data.

One such nonlinear diffusion method presented by Perona and Malik, "Scale-Space and Edge Detection Using Anisotropic Diffusion", IEEE Transactions on Pattern Analysis and Machine Intelligence, vol. 12, no. 7, pp. 629-639, July 1990, uses two design inputs for filtering an image. The first input is a function for mapping image intensities to diffusion constants and the second input is a stopping parameter which indicates how long the diffusion process is to run. A filtered image is then produced by taking its original grayscale values as an initial distribution and solving an anisotropic diffusion equation for a pre-specified amount of time.

A drawback of the technique proposed by Perona and Malik is that it does not it does not take into account inhomogeneous data sampling or enable the adjustment of tuning constants. In addition, it does not provide a method for choosing convergence criteria (e.g., the stopping parameter). Accordingly, there is a need for a technique of reducing noise in medical images such that noisy or high frequency objects are homogenized while preserving inter-object contrast.

SUMMARY OF THE INVENTION

The present invention overcomes the foregoing and other problems encountered in the known teachings by providing a system and method for filtering noise from a medical image.

In one embodiment of the present invention, a method for filtering noise from an image comprises: generating a weighted graph representing the image; selecting a plurality of nodes from the image to retain grayscale values of the plurality of nodes; and determining filtered grayscale values of the plurality of nodes.

The weighted graph is generated with weights given by:

$$\omega_{ij}=e^{-\beta(p_i-p_j)^2}$$

where $p_i$ is an intensity at a first node of the plurality of nodes, $p_j$ is an intensity at a second node of the plurality of nodes and $\beta$ is an anisotropy parameter.

The plurality of nodes is selected manually or automatically. The plurality of nodes are pixels or voxels representing portions of the image.

Determining filtered grayscale values of the plurality of nodes comprises: identifying the plurality of nodes as a Dirichlet boundary condition; and solving a combinatorial, anisotropic Dirichlet boundary value problem using the Dirichlet boundary condition.

The image is acquired using one of a magnetic resonance (MR), CT, PET, a two-dimensional (2D) or three-dimensional (3D) fluoroscopic, a 2D, 3D, or four-dimensional (4D) ultrasound, or x-ray imaging technique.

In another embodiment, a system for filtering noise from an image comprises: a memory device for storing a program; a processor in communication with the memory device, the processor operative with the program to: generate a weighted graph representing the image; select a plurality of nodes from the image to retain grayscale values of the plurality of nodes; and determine filtered grayscale values of the plurality of nodes.

The weighted graph is generated with weights given by:

$$\omega_{ij}=e^{-\beta(p_i-p_j)^2}$$

where $p_i$ is an intensity at a first node of the plurality of nodes, $p_j$ is an intensity at a second node of the plurality of nodes and $\beta$ is an anisotropy parameter.

The selection of the plurality of nodes is performed automatically or in response to a manual input. The plurality of nodes are pixels or voxels representing portions of the image.

When determining filtered grayscale values of the plurality of nodes, the processor is operative with the program code to: identify the plurality of nodes as a Dirichlet boundary condition; and solve a combinatorial, anisotropic Dirichlet boundary value problem using the Dirichlet boundary condition.

The image is acquired using one of an MR, CT, PET, a 2D or 3D fluoroscopic, a 2D, 3D, or 4D ultrasound, or x-ray imaging device.

In yet another embodiment of the present invention, a method for denoising a medical image comprises: applying Dirichlet boundary conditions to a subset of pixels in the medical image; clamping original grayscale values of the subset of pixels in the medical image; and solving the anisotropic Dirichlet problem to determine interpolated grayscale values of the subset of pixels in the medical image.

The Dirichlet boundary conditions are applied with an increased or decreased sampling density to respectively increase or decrease the amount of noise removed from the medical image.

When clamping the original grayscale values of the subset of pixels, the subset of pixels is selected to have a probability proportional to the homogeneity of a local region of the subset of pixels. The anisotropic Dirichlet problem is solved by using conjugate gradients.

The method further comprises producing a denoised version of the medical image using the interpolated grayscale values in place of the original grayscale values. The method further comprises outputting the denoised version of the medical image. The method further comprises selecting the subset of pixels manually or automatically.

The medical image is acquired using one of an MR, CT, PET, a 2D or 3D fluoroscopic, a 2D, 3D, or 4D ultrasound, or x-ray imaging technique.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
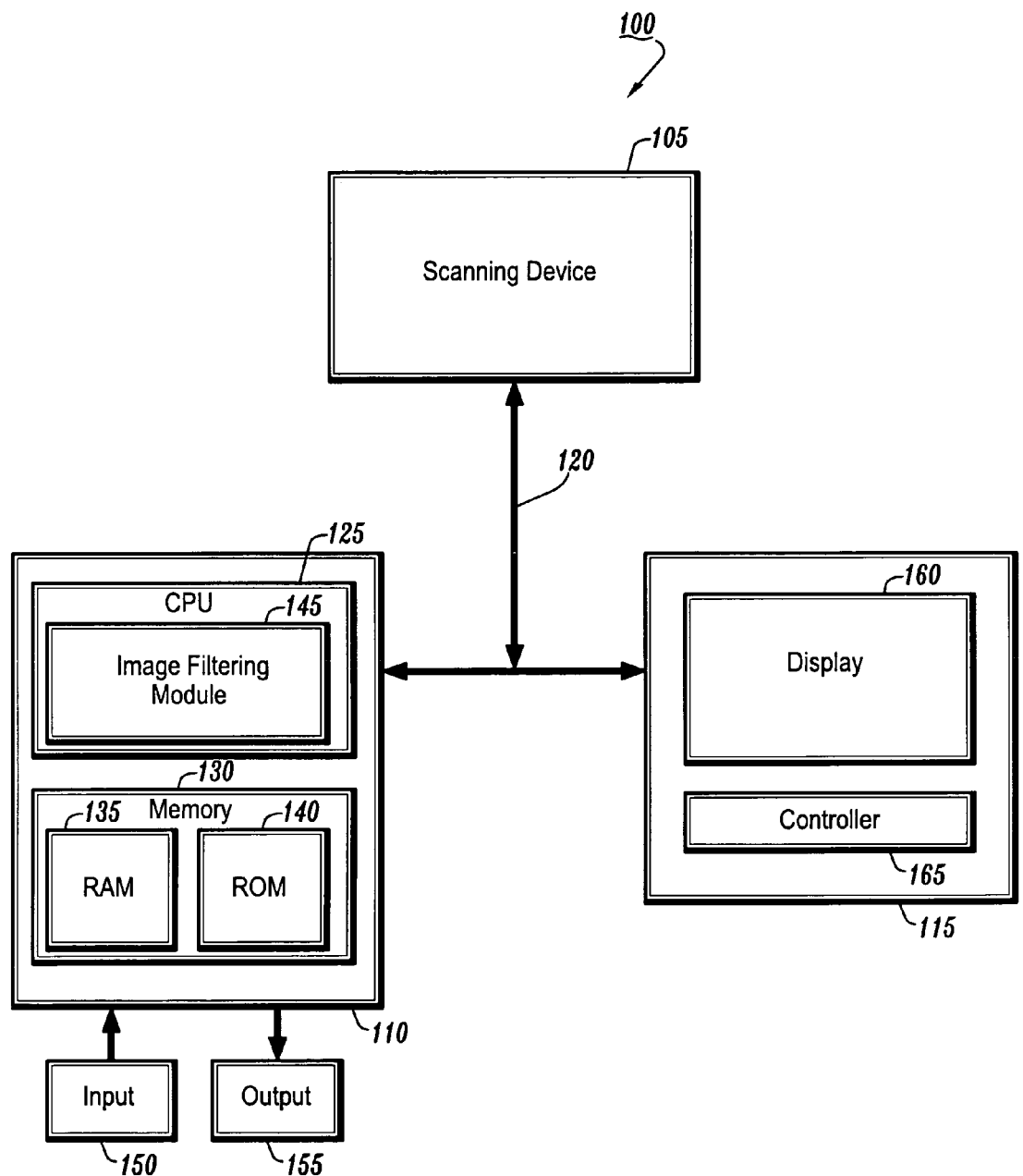
FIG. 1 is a block diagram of a system for filtering noise from a medical image according to an exemplary embodiment of the present invention.

FIG. 1 is a block diagram of a system 100 for filtering noise from a medical image according to an exemplary embodiment of the present invention.

As shown in FIG. 1, the system 100 includes, inter alia, an acquisition device 105, a personal computer (PC) 110 and an operator's console 115 connected over, for example, an Ethernet network 120. The acquisition device 105 may be a magnetic resonance (MR) imaging device, a CT imaging device, a helical CT device, a PET device, a two-dimensional (2D) or three-dimensional (3D) fluoroscopic imaging device, a 2D, 3D, or four-dimensional (4D) ultrasound imaging device, or an x-ray device.

The acquisition device 105 may also be a hybrid-imaging device capable of CT, MR, PET or other imaging techniques. The acquisition device 105 may further be a flatbed scanner that takes in an optical image and digitizes it into an electronic image represented as binary data to create a computerized version of a photo or illustration.

The PC 110, which may be a workstation, portable or laptop computer, a personal digital assistant (PDA), etc., includes a central processing unit (CPU) 125 and a memory 130, which are connected to an input 150 and an output 155. The CPU 125 includes an image filtering module 145 that includes one or more methods for filtering noise from a medical image according to an exemplary embodiment of the present invention.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, or printer.

The operation of the system 100 is controlled from the operator's console 115, which includes a controller 165, for example, a keyboard, and a display 160, for example, a CRT display. The operator's console 115 communicates with the PC 110 and the acquisition device 105 so that 2D image data collected by the acquisition device 105 can be rendered into 3D data by the PC 110 and viewed on the display 160. It is to be understood that the PC 110 can be configured to operate and display information provided by the acquisition device 105 absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 110 may also include an image rendering system/tool/application for processing digital image data of an acquired image dataset to generate and display 2D and/or 3D images.

As shown in FIG. 1, the image filtering module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Before discussing a method for filtering noise from a medical image according to an exemplary embodiment of the present invention, the Dirichlet problem will first be formulated and solved. The relationship between the solution to the Dirichlet problem and diffusion will then be discussed followed by the flexibility of choosing a sampling scheme for use with an exemplary embodiment of the present invention. Finally, a selected sampling scheme for use with an exemplary embodiment of the present invention will be compared to anisotropic diffusion.

The Dirichlet problem will now be discussed.

The Dirichlet integral on a Euclidean, or more generally on a Riemannian manifold with a metric tensor $g_{xy}$ (having a determinant g), with $d\Omega = d_x d_y$ is defined as:

$$D[u] = \frac{1}{2}\int_\Omega d\Omega |\nabla u(x,y)|^2 \qquad [1]$$

$$= \frac{1}{2}\int_\Omega d\Omega d_x \sqrt{gg^{xy}}\, d_y u(x,y) \qquad [2]$$

for a field u(x,y) and region $\Omega$. This integral arises in many physical situations including, for example, heat transfer, electrostatics and random walks.

Before progressing, it is to be understood that one of the principles of a method of filtering noise from a medical image according to an exemplary embodiment of the present invention is to provide a means of dealing with the second, metric dependent form by implicitly generating a metric using image content by specifying weights and then efficiently implementing the solution in terms of a coordinate free identification of an image graph incidence matrix with combinatorial versions of differential operators. Thus, for simplicity, these ideas will be outlined in terms of the continuum, Euclidean form of Dirichlet's Principle in combinatorial graph theoretic terms.

A harmonic function is a function that satisfies the Laplace equation:

$$\nabla^2 u = 0. \qquad [3]$$

The task of finding a harmonic function subject to its boundary values is called the Dirichlet problem. The harmonic function that satisfies the boundary conditions minimizes the Dirichlet integral since the Laplace equation is the Euler-Lagrange equation for the Dirichlet integral. In a graph setting, points for which there exist a fixed value (e.g., data nodes) are termed boundary points. The set of boundary points provides a Dirichlet boundary condition. Points for which the values are not fixed (e.g., missing data nodes) are termed interior points.

Three characteristics of harmonic functions are attractive qualities for generating a smooth image from the boundary points, they are exemplified by: 1) the mean value theorem. It states that the value at each point in the interior (e.g., not a boundary point) is the average of its neighbors. In other words, a weighted average of its neighbors; 2) the maximum principle which follows from the mean value theorem. It states that harmonic functions may not take values on interior points that are greater than or less than the values taken on the boundary; and 3) that the Dirichlet integral is minimized by harmonic functions. In other words, the weighted sum of the gradients in the reconstructed image is minimal.

The smoothness imposed by the harmonic function with respect to the metric tensor is represented in this case by the edge weights. Therefore, discontinuous intensity boundaries will tend to be retained but smoothly varying regions of intensity will tend to be uniformized.

The combinational formulation of the Dirichlet problem will now be discussed.

A graph consists of a pair $G=(V, E)$ with vertices $v \in V$ and edges $e \in E \subseteq V \times V$ having cardinalities $n=|V|$ and $m=|E|$. An edge, e, which spans two vertices, $v_i$ and $v_j$, is denoted by $e_{ij}$. A weighted graph assigns a value (e.g., typically nonnegative and real) to each edge called a weight. The weight of an edge, $e_{ij}$, is denoted by $w(e_{ij})$ or $w_{ij}$. The degree of a vertex is $d_i = \Sigma w(e_{ij})$ for all edges $e_{ij}$ incident on $v_i$. Requiring that $w_{ij} > 0$ for all i and j permits interpretation of $1/w_{ij}$ as a distance between nodes $v_i$ and $v_j$.

In other words, nodes connected by an edge with a large weight may be thought of as being highly connected. In an analogy of an electrical circuit, the act of approaching an infinite weight on an edge spanning two nodes is analogous to approaching an electrical short between the nodes. In other words, weight is interpreted as electrical conductance.

One representation of the combinatorial Laplacian operator is as the n×n Laplacian matrix:

$$L_{v_i v_j} = \begin{cases} d_{v_i} & \text{if } i = j, \\ -w_{ij} & \text{if } v_i \text{ and } v_j \text{ are adjacent nodes}, \\ 0 & \text{otherwise}, \end{cases} \quad [4]$$

where $L_{v_i v_j}$ is used to indicate the matrix L is indexed by vertices $v_i$ and $v_j$.

Next, the m×n edge-node incidence matrix is defined as:

$$A_{e_{ij} v_k} = \begin{cases} +1 & \text{if } i = k, \\ -1 & \text{if } j = k, \\ 0 & \text{otherwise}, \end{cases} \quad [5]$$

for every vertex $v_k$ and edge $e_{ij}$, where each $e_{ij}$ has been arbitrarily assigned an orientation. As with the Laplacian matrix above, $A_{e_{ij} v_k}$ is used to indicate that the incidence matrix is indexed by edge $e_{ij}$ and node $v_k$. As an operator, A may be interpreted as a combinatorial gradient operator and $A^T$ as a combinatorial divergence.

In an m×m constitutive matrix, C, is defined as the diagonal matrix with the weights of each edge along the diagonal. As in the continuum setting, the isotropic combinatorial Laplacian is the composition of the combinatorial divergence operator with the combinatorial gradient operator, $L=A^T A$. The constitutive matrix C may thus be interpreted as representing a Riemannian metric in the sense that it defines a positive inner product on the vector space of 1-cochains (e.g., functions defined on the edge set). In this sense, the combinatorial Laplacian generalizes to the combinatorial Laplace-Beltrami operator via $L=A^T C A$.

Similar reasoning has been employed in the continuum context of non-linear diffusion, where the diffusion constants are interpreted as a Riemannian metric. The case of a trivial metric (e.g., equally weighted, unit valued edges) reduces to $C=I$ and $L=A^T A$.

With these definitions in place, it can then be determined how to solve for the harmonic function that interpolates values on free (e.g., interior) nodes between values on fixed (e.g., boundary) nodes.

A combinatorial formulation of the Dirichlet integral from equation [1] is:

$$D[u] = \frac{1}{2}(Au)^T C(Au) = \frac{1}{2} u^T L u \quad [6]$$

and a combinatorial harmonic is a function u that minimizes equation [6]. Since L is positive semi-definite, the only critical points of D[u] will be minima.

To clamp the values of boundary nodes and compute the unclamped values across interior nodes, it may be assumed without loss of generality that the nodes in L and u are ordered such that boundary nodes are first and interior nodes are second. Therefore, equation [6] may be decomposed into:

$$D[u_i] = \frac{1}{2}[u_b^T u_i^T]\begin{bmatrix} L_b R \\ R^T L_i \end{bmatrix}\begin{bmatrix} u_b \\ u_i \end{bmatrix} \quad [7]$$

$$= u_b^T L_b u_b + 2u_i^T R^T u_b + u_i^T L_i u_i$$

where $u_b$ and $u_i$ correspond to the potentials of the boundary and interior nodes respectively. Differentiating $D[u_i]$ with respect to $u_i$ and finding the critical points yields:

$$L_i u_i = -R^T u_b \quad [8]$$

which is a system of linear equations with $|u_i|$ unknowns. If the graph is connected, or if every connected component contains a boundary node, then equation [8] will be nonsingular.

Although various methods exist for solving a system of linear equations, the conjugate gradient method is preferred due to its speed and parallelization characteristics. Conjugate gradients require one sparse matrix multiply per iteration, which is bounded above by $d_{max} s$, where $d_{max}$ is the maximum degree of an interior node and s is the cardinality of the set of interior nodes. Assuming a constant number of iterations are required for convergence and that the maximum degree is independent of the number of nodes (e.g., a 4-connected lattice), the time complexity of the algorithm is $\vartheta(s)$.

The relationship between the solution to the Dirichlet problem, which forms a basis for a method for filtering noise from a medical image according to an exemplary embodiment of the present invention, and anisotropic diffusion, which forms the basis for conventional filtering algorithms, will now be discussed.

As in the continuous situation, the solution to the Laplace equation may be viewed as the steady-state solution to the diffusion equation, for example:

$$\frac{d_t}{dt} = \nabla^2 u \quad \text{(Diffusion equation)} \quad [9]$$

$$0 = \nabla^2 u \quad \text{(Laplace equation)} \quad [10]$$

If there are no boundary conditions present, the solution to the Laplace equation (e.g., diffusion with t=∞) would be a uniform constant. However, when boundary conditions are present, the solution may be viewed as an anisotropic interpolation over the interior (e.g., non-boundary) nodes. Similar results are produced for image enhancement tasks using (e.g., steady state) anisotropic diffusion, however, according to a method of the present invention a few advantages over diffusion become evident.

First, the solution to the Laplace equation is a steady-state solution, while the solution to the diffusion equation depends on time. In other words, when filtering noise from a medical image according to an exemplary embodiment of the present invention, a steady-state solution is obtained, while the solution to the diffusion equation depends on time. Thus, the need for choosing a stopping time for the diffusion is eliminated. Second, the present invention enables the selection of boundary points. This offers the flexibility to diffuse more or diffuse less in different image regions. This will be discussed in more detail hereinafter with reference to FIGS. 2 and 3.

Because anisotropic diffusion methods for image filtering typically encode image values with a set of diffusion constants and initial conditions, the mapping of the image values to diffusion constants (e.g., weights) is given by:

$$\omega_{ij} = e^{-\beta(p_i - p_j)^2} \quad [11]$$

where $p_i$ is the image intensity at node, pixel or voxel $v_i$, $p_j$ is the image intensity at node, pixel or voxel $v_j$ and $\beta$ is a parameter that controls the severity of the anisotropy induced by the image intensity. It is to be understood that a variety of other possibilities exist for controlling the severity of the anisotropy. For example, when thresholding an edge detector to produce weights of 0 or 1, the severity of the anisotropy could be controlled by adjusting the threshold. In addition, a variety of other techniques for mapping image values to diffusion constants may be used. For example, the function, $$\frac{\beta}{(\beta + (p_i - p_j)^2)}, \quad [12]$$

may be used or an edge detector such as a Sobel or Canny edge detector can be applied to the image data and then a weight equal to 1 if a pixel is off an edge or equal to or near 0 if the pixel lies near an edge can be applied.

Following the approach of anisotropic diffusion, an image may be modeled as being composed of objects having constant intensity. The goal of homogenizing intensity within these objects while preserving their inter-object density discontinuities may be taken. In this context, the sampling regime would be to choose samples from uniform areas of an image, represented by the quantity:

$$h = |A^T||Ap| \quad [13]$$

for the set of pixels, where A represents the incidence matrix defined in equation [5], $|A^T|$ represents the element-wise absolute value of $A^T$ (e.g., all positive entries), $|Ap|$ represents the absolute value of the gradient, p is the vectorized image and h is the sum of the edge gradients incident on each node. Viewing a normalized h as a probability of sampling each node, a fixed number of samples can be randomly generated and the samples can be selected as boundary conditions. The combinatorial Dirichlet problem is then solved over the remaining nodes given the fixed set.

A method for filtering noise from a medical image according to an exemplary embodiment of the present invention will now be discussed with reference to FIG. 2.

Figure 2:
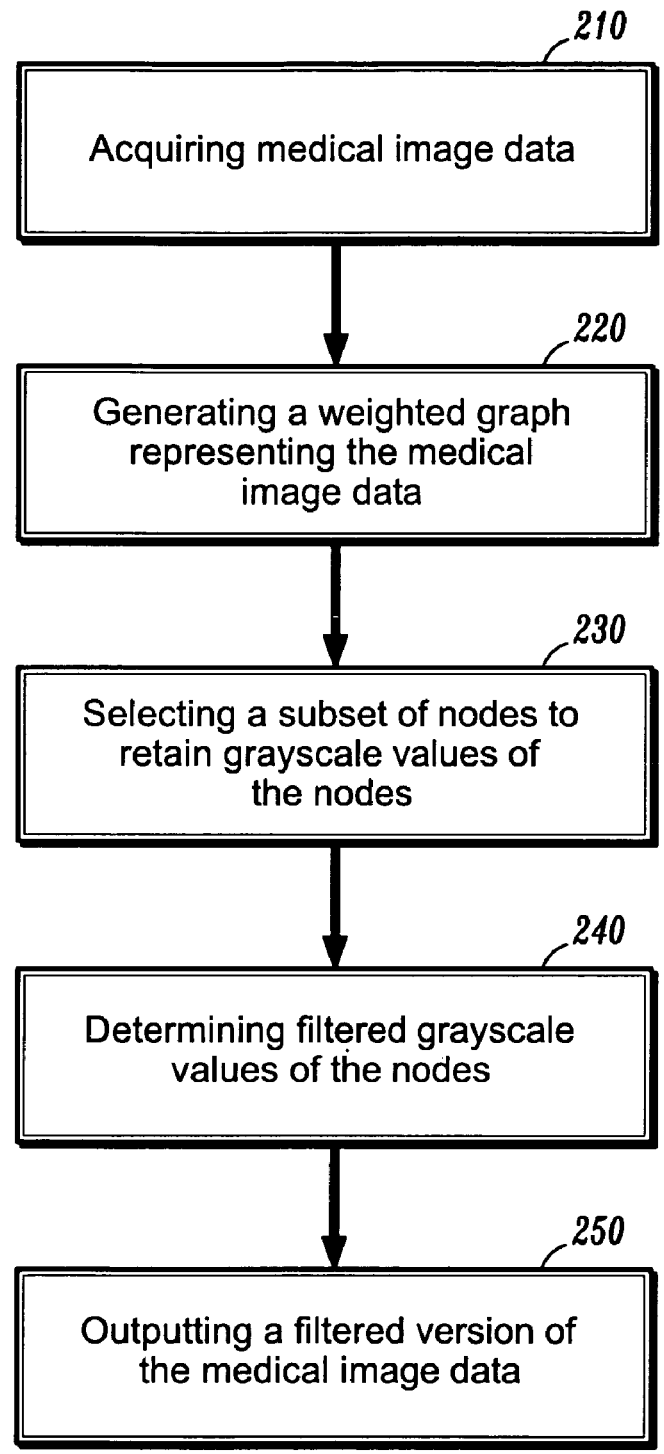
FIG. 2 is a flowchart illustrating a method for filtering noise from a medical image according to an exemplary embodiment of the present invention.
Figure 3A:
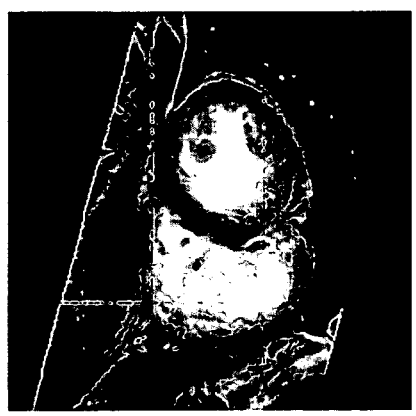
FIG. 3 is a series of images illustrating filtering noise from a medical image according to an exemplary embodiment of the present invention compared to a medical image filtered using anisotropic diffusion.
Figure 3B:
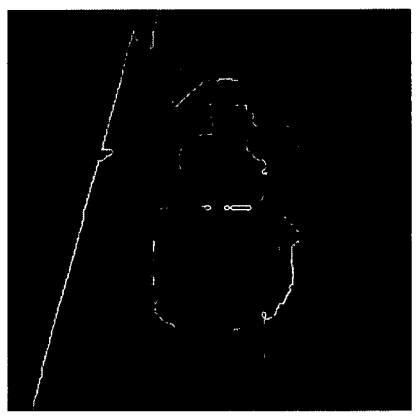
Figure 3C:
Figure 3D:
Figure 3E:
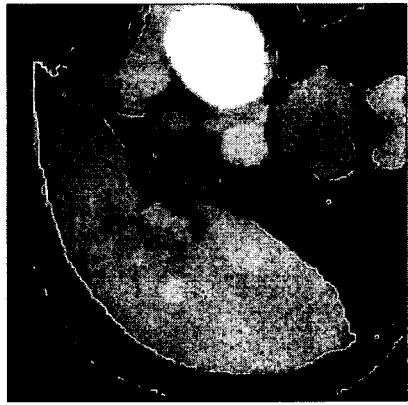
Figure 3F:

As shown in FIG. 2, medical image data is acquired from a patient (210). For exemplary purposes, CT image data of a pulmonary vessel tree is acquired in this step. This is accomplished by using the acquisition device 105, in this example a CT scanner, which is operated at the operator's console 115, to scan the patient's chest or lungs thereby generating a series of 2D image slices associated with the lungs. The 2D image slices of the lungs are then combined to form a 3D image of the pulmonary vessel tree. In addition to the lungs, it is to be understood that the CT image data can be acquired from any body organ of interest. Further, the image data could be non-medical image data. The image data could also be from a high-dimensional dataset such as a volume in time.

Once the medical image data is acquired and ready for analysis, a weighted graph representing the image may be generated (220). This may be accomplished by using equation [11] discussed above. The weighted graph may also be generated using, for example, equation [12] or some of the techniques discussed above with reference thereto. After generating the weighted graph, a subset of nodes from the weighted graph is selected (230).

This subset of nodes is selected such that the grayscale values of the selected nodes can be retained. It is to be understood that the subset of nodes may be selected manually by a user simply selecting a portion of the image displayed on a screen of the operator's console 115 by using a mouse. In addition, the subset of nodes may be selected automatically by using an automatic node selection technique such as that described above with reference to equation [13].

Once the subset of nodes have been selected, filtered grayscale values of the nodes are determined (240). This is accomplished, for example, by identifying the subset of nodes as a Dirichlet boundary condition; and solving a combinatorial, anisotropic Dirichlet boundary value problem (e.g., equation [8]) using the Dirichlet boundary condition. The combinatorial, anisotropic Dirichlet boundary value problem may be solved using conjugate gradients. It is to be understood, however, that a variety of techniques used for solving a system of equations may be used to solve the combinatorial, anisotropic Dirichlet problem. It should also be understood that a discretized continuous Dirichlet problem could be solved here.

After the filtered grayscale values of the nodes have been determined, they are used to form a filtered version of the originally acquired medical image and are output to a user for analysis (250). In other words, the filtered values, which are determined by solving equation [8], are reapplied to the original medical image and used in place of its original grayscale values. This results in a filtered medical image that is homogenized while having its inter-object contrast preserved, thus providing a clean image for a medical practitioner to analyze. It is to be understood that the filtered image may then undergo further medical image processing such as segmentation, registration, visualization, etc.

FIG. 3 illustrates images filtered in accordance with an exemplary embodiment of the present invention compared to images filtered using diffusion filtering. For both methods of filtering, a 4-connected lattice was used with weights obtained from equation [11].

As shown in FIG. 3, the top row of images, images (a-c) includes an original cardiac image (a), a diffusion filtered image (b) of the original image (a) and an image (c) of the original image (a) filtered in accordance with an exemplary embodiment of the present invention. The bottom row of image, images (d-f) includes an original liver image (d), a diffusion filtered image (e) of the original image (d) and an image (f) of the original image (d) filtered in accordance with an exemplary embodiment of the present invention.

As can be gleaned, when comparing an image filtered according to an exemplary embodiment of the present invention to an image filtered using anisotropic diffusion, because filtering according to the present invention clamps the intensity values of the sampled points, original intensity values and contrasts are roughly preserved, while diffusion pushes all intensity values toward a uniform gray value.

In accordance with an exemplary embodiment of the present invention, the system and method for filtering noise from a medical image applies Dirichlet boundary conditions at a small subset of pixels, clamps their grayscale values and solves the combinatorial anisotropic Dirichlet problem. In doing so, the system and method does not use a stopping parameter and provides flexibility in choosing Dirichlet boundary conditions. This is done by increasing or decreasing the sampling density of boundary points in selected regions.

It is to be understood that a filter in accordance with an exemplary embodiment of the present invention may be used as pre-processor to denoise, downsample or segment medical images. Further, because the filter in accordance with an exemplary embodiment of the present invention depends on the topology of a structure and not on information regarding the dimensionality in space in which it is located, one may use the filter on graph structures existing in arbitrary dimensions possessing an arbitrary metric.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for filtering noise from a medical image, comprising:

a memory device storing a program;

a processor in communication with the memory device, the processor operative with the program to:

generate a weighted graph representing the medical image;

selecting a subset of nodes from a plurality of nodes in the weighted graph, wherein each node in the subset of nodes is designated to retain its original grayscale values;

viewing the subset of nodes as a set of Dirichlet boundary points;

solving a combinatorial, anisotropic Dirichlet boundary value problem for each node of the plurality of nodes using the set of Dirichlet boundary points, except for the subset of nodes, to provide an interpolated grayscale value thereof; and forming a filtered version of the medical image by replacing an original grayscale value of each of the plurality of nodes with its corresponding interpolated grayscale value, and keeping the original grayscale value of each node in the subset of nodes.

2. The method of claim 1, wherein the weighted graph is generated with weights given by:

$$\omega_{ij} = e^{-\beta(p_i - p_j)^2}$$

where $p_i$ is an intensity at a first node of the plurality of nodes, $p_j$ is an intensity at a second node of the plurality of nodes and $\beta$ is an anisotropy parameter.

3. The method of claim 1, wherein the subset of nodes is selected manually or automatically.

4. The method of claim 1, wherein the subset of nodes represents pixels or voxels in the medical image.

5. The method of claim 1, wherein the medical image is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, or x-ray imaging technique.

6. A system for filtering noise from a medical image comprising:

a memory device storing a program;

a processor in communication with the memory device, the processor operative with the program to:

generate a weighted graph representing the medical image;

select a subset of nodes from a plurality of nodes in the weighted graph, wherein each node in the subset of nodes is designated to retain its original grayscale values;

view the subset of nodes as a set of Dirichlet boundary points;

solve a combinatorial, anisotropic Dirichlet boundary value problem for each node of the plurality of nodes using the set of Dirichlet boundary points, except for the subset of nodes, to provide an interpolated grayscale value thereof; and form a filtered version of the medical image by replacing an original grayscale value of each of the plurality of nodes with its corresponding interpolated grayscale value, and keeping the original grayscale value of each node in the subset of nodes.

7. The system of claim 6, wherein the weighted graph is generated with weights given by:

$$\omega_{ij} = e^{-\beta(p_i - p_j)^2}$$

where $p_i$ is an intensity at a first node of the plurality of nodes, $p_j$ is an intensity at a second node of the plurality of nodes and $\beta$ is an anisotropy parameter.

8. The system of claim 6, wherein the selection of the subset of nodes is performed automatically or in response to a manual input.

9. The system of claim 6, wherein the subset of nodes represents pixels or voxels in the medical image.

10. The system of claim 6, wherein the medical image is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, or x-ray imaging device.

11. The method of claim 1, wherein the subset of nodes is selected by choosing samples from uniform areas of the medical image in accordance with the following equation:

$$h = |A^T||Ap|,$$

where A represents an incidence matrix, $|A^T|$ represents an absolute value of A, $|Ap|$ represents an absolute value of a gradient, p is a vectorized version of the medical image and h is a sum of edge gradients incident on each node in the uniform area;

viewing a normalized h as a probability of sampling each node in the uniform area; and randomly generating a fixed number of samples and selecting these as the Dirichlet boundary points.

* * * * *